Dec. 15, 1931. W. CHRISTIE 1,836,446
SUSPENSION FOR VEHICLES
Original Filed April 30, 1928 3 Sheets-Sheet 3
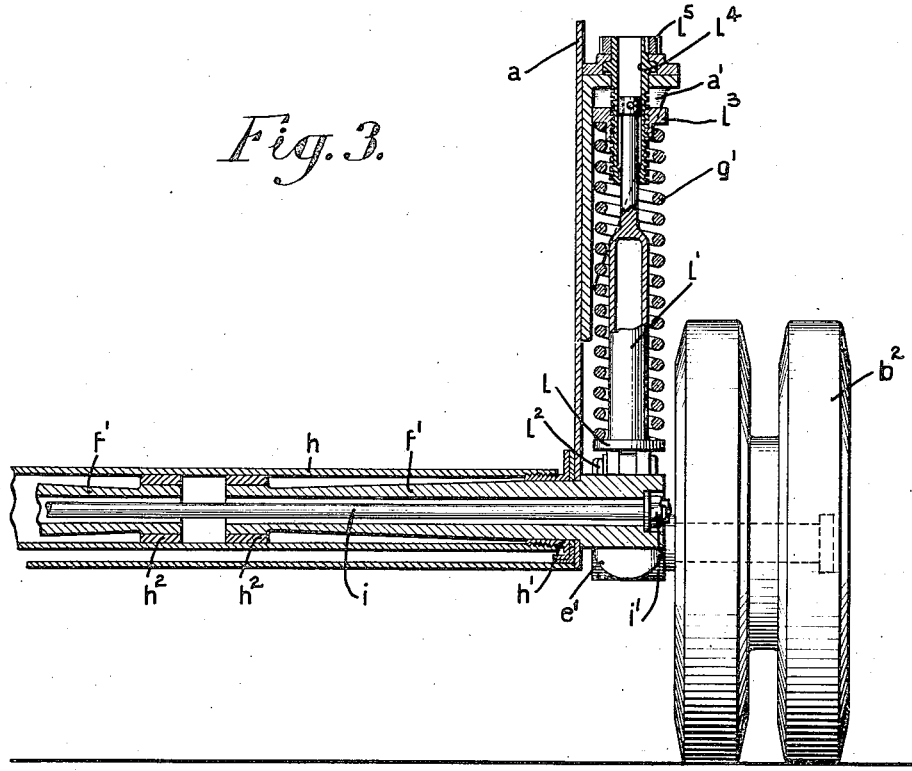
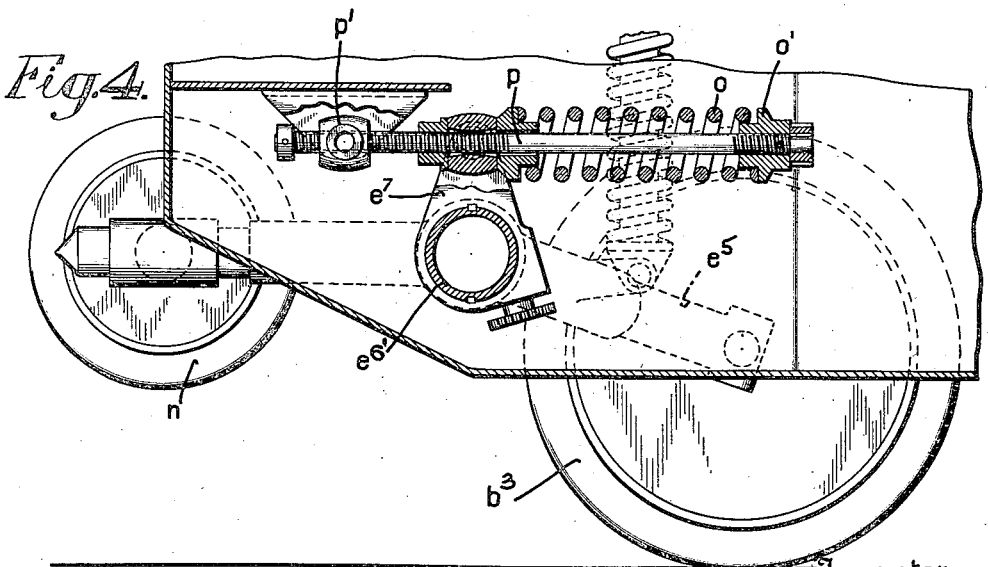

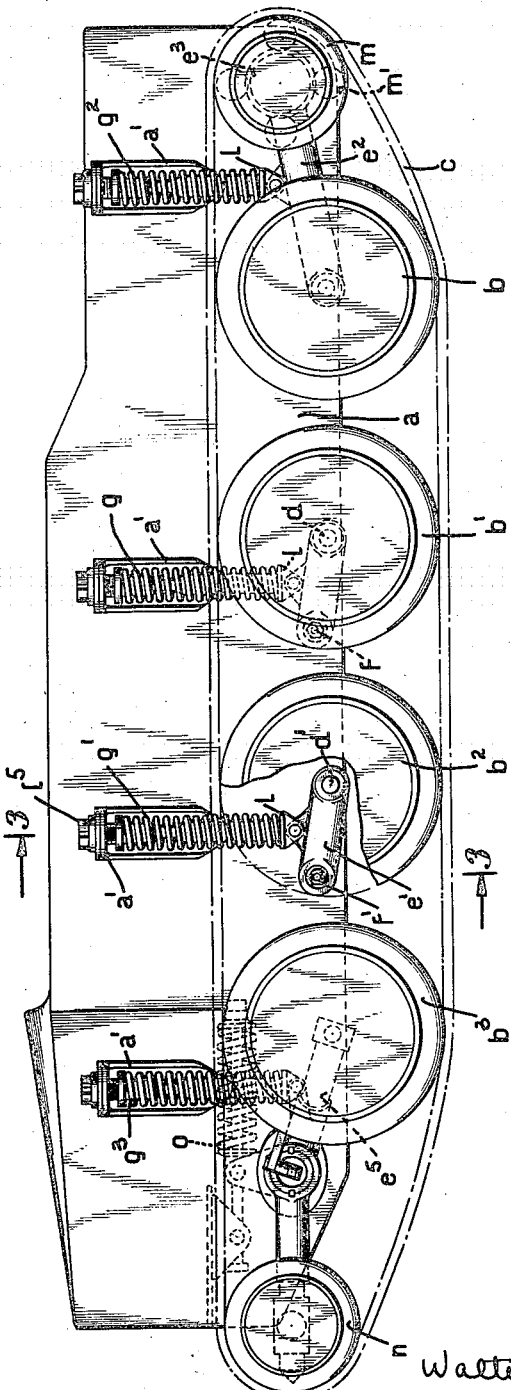

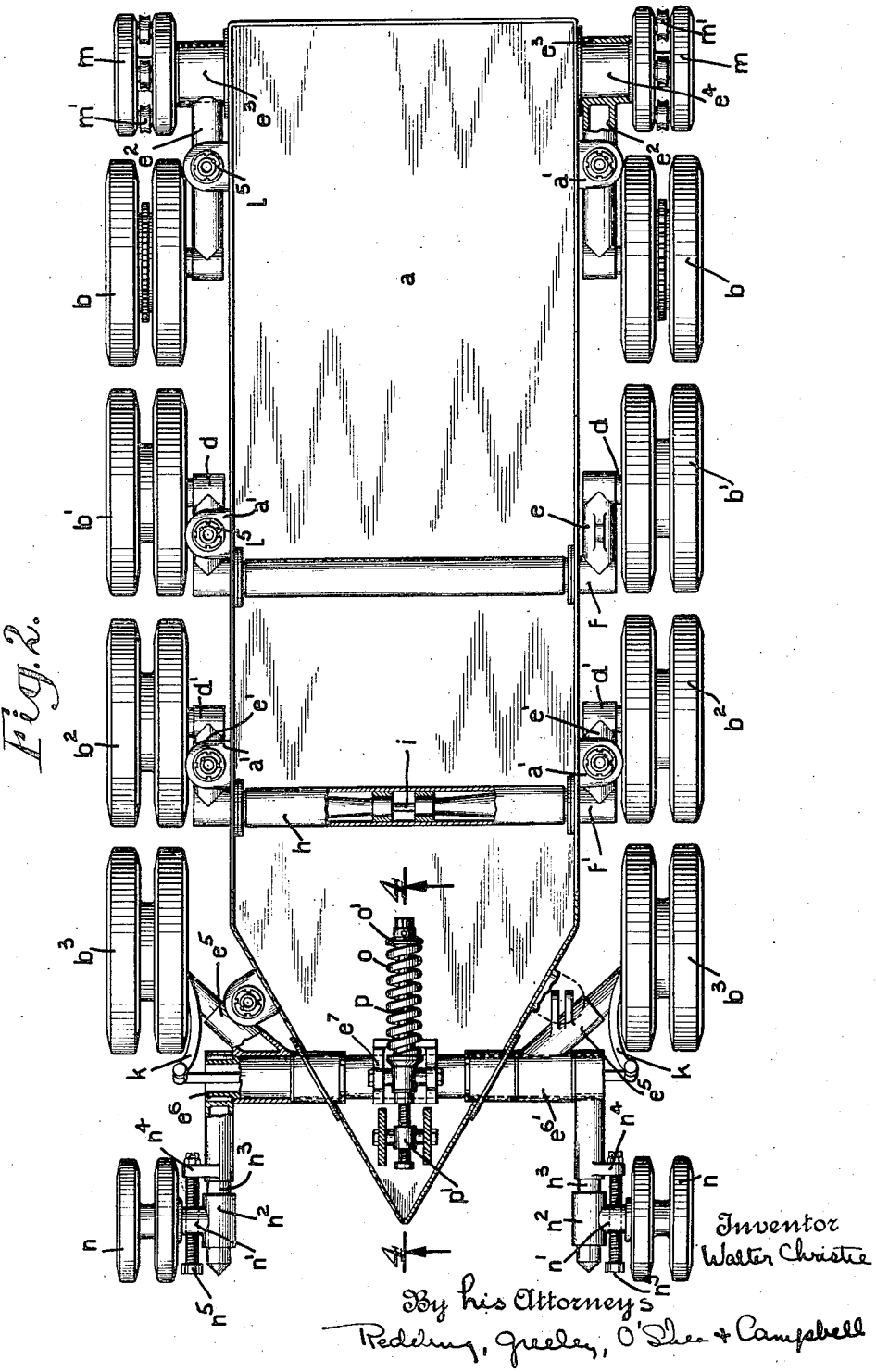

UNITED STATES PATENT OFFICE

WALTER CHRISTIE, OF AVON, NEW JERSEY

SUSPENSION FOR VEHICLES

Application filed April 30, 1928, Serial No. 274,098. Renewed May 5, 1931.

This invention relates to an improved suspension for vehicles in which the widest possible range of flexibility and wheel action is afforded, but always under the yielding restraint of what may be regarded as super-springs. The construction and relationship of parts is such that a super-spring action becomes possible, no limitation on the range of movement of individual wheels being imposed other than such factors of design as are determined upon in advance. More particularly, the improved suspension is one in which a vehicle frame is supported by a plurality of wheels carried at opposite sides and mounted separately so that each individual wheel may have its own free action, subject to the restraint offered by its own spring and the wheels thereby closely follow the terrain without interfering with or modifying the action of the remaining wheels. In accomplishing this purpose, it is proposed, broadly, to mount each wheel on a stub axle carried by a rigid arm, which itself is journaled in the frame of the vehicle, so as to rock freely. Movement of the arm is resisted by a spring associated therewith and at some point between its fulcrum and the stub axle, the tension of this spring and its range of movement being determinable by suitable adjusting devices.

In the preferred embodiment of the invention, it is proposed to suspend four such wheels at each side of the vehicle frame, each one of which is mounted on its own arm and has its own super-spring associated therewith.

A further object of the invention is to provide in a vehicle having the type of suspension referred to, means to facilitate the pivotal mounting of rock shafts for the supporting arms of aligned wheels at opposite sides of the vehicle. Such a mounting may be provided in the frame as a cross tube which receives the opposed rock shafts.

Still another object of the invention is to provide in such a vehicle suspension, adaptation for tracks to convert the vehicle into one of the track layer type, including adjustable idlers for the respective tracks and a common reaction spring for such idlers, such spring itself having its tension adjustable.

A further object of the invention is to associate with the supporting means for such track idlers, supporting arms for one pair of vehicle wheels sprung in accordance with the broad objects of the invention set forth hereinbefore.

A further object of the invention is to provide driving sprockets in a track layer vehicle of the type described, formed with a plurality of rollers to cooperate with the driving lugs of the respective tracks, said rollers being removable to permit the substitution therefor of a driving sprocket of suitable form when the vehicle is converted from a track layer type into an ordinary road vehicle having a conventional chain drive.

These and other objects of the invention will appear more particularly hereinafter in connection with the detailed description of the embodiment illustrated in the drawings, by way of example and in which:

Figure 1 is a view in side elevation of a vehicle having the improved suspension and of the convertible track layer type in which the road wheels receive the tracks and are wholly flexible whether the vehicle is employed as a track layer or a road vehicle.

Figure 2 is a view in plan of the type of vehicle shown in Figure 1 with the tracks omitted.

Figure 3 is a fragmentary detail view in section taken on the plane indicated by the line 3—3 of Figure 1 and looking in the direction of the arrows and showing the relation of one of the super-springs to the supporting rock shaft for one of the wheels.

Figure 4 is a fragmentary detail view in section taken on the plane indicated by the line 4—4 of Figure 2 and looking in the direction of the arrows and showing the common spring for maintaining the action of the track idlers.

There is illustrated in Figures 1 and 2, somewhat conventionally, the frame $a$ of a vehicle of any type supported by a plurality of road wheels $b$, $b'$, $b^2$ and $b^3$ at opposite sides. These road wheels may have any suitable treads, such as rubber tires. In the type of vehicle illustrated, these wheels are of a dual type having dual connections over which may be applied a track c indicated in dotted lines in Figure 1. The improvements herein, however, are equally useful in any type of vehicle, whether or not it is of the convertible track load type and whether or not the road wheels are single or dual. The suspension for the wheels is very effective for road vehicles but, at the same time, it also affords a very efficient track action when tracks are applied. The principal object is to obtain the utmost in springiness under difficult conditions of terrain, while affording the maximum range of action for the supporting wheels against the yielding resistance of their respective springs. To obtain this the wheels $b'$, $b^2$ are shown as journaled in the stub axles $d$, $d'$, respectively, which in turn are carried on rock shafts $f$, $f'$ journaled in the vehicle. At some point between the rock shafts $f$, $f'$ and the stub axles $d$, $d'$, respectively, are associated springs $g$, $g'$, respectively, which are preferably vertically disposed and seated on the vehicle frame $a$ in a manner which will hereinafter be described. In Figure 2, a convenient method of mounting the wheels $b^2$ in opposed pairs is illustrated. A tube $h$, which itself may constitute a truss, extends across the vehicle body and the opposed rock shafts $f'$ of the arms $e'$ are shown as extending into this tube from opposite ends. Each rock shaft $f'$ may be tubular so that a tie rod $i$ may extend therethrough from side to side and by means of nuts $i'$ serve to hold the opposed rock shafts against axial displacement in the tube $h$. Each rock shaft $f'$ may have a bearing member $h'$ adjacent the outer end of the tube $h$ and a bearing $h^2$ at its inner end. The wheels $b$ are supported with the same action which is afforded the wheels $b'$, $b^2$, although in the embodiment illustrated, the wheels $b$ are shown as carried on an arm $e^2$ which ends in a plain cylindrical bearing $e^3$ supported pivotally on a trunnion $e^4$ mounted on the vehicle. A spring $g^2$ similar to those heretofore referred to engages the arm $e^2$ between the trunnion $e^4$ and the supporting stub axle for the wheel $b$, so that the same action is insured.

At the other end of the vehicle, the wheels $b^3$ also have their separate supporting devices of a suitable design to accommodate them, while preserving the type of action which constitutes the important improvement herein. As shown in the drawings, the axle for each wheel $b^3$ is carried on a supporting arm $e^5$ which is inclined inwardly and upwardly somewhat to conform to the vehicle design and terminates in a plain cylindrical bearing $e^6$ which is journaled on a tube $e^{6'}$ which extends across the vehicle. Springs $g^3$ similar to those heretofore described are associated with each arm $e^5$ at a point between the bearing $e^6$ and the stub axle for the wheel $b^3$ so as to give the same wheel action.

From the description thus far given, it will be evident that the improved spring suspension insures the greatest possible degree of flexibility in that movement of each wheel is resisted yieldingly by its own spring which is of such character and so associated with the wheel as to have a super-spring action and afford the maximum range of movement for accommodation to irregular terrain. As a road vehicle, the wheels $b^3$ may be steerable through suitable linkage indicated at $k$, but this constitutes no part of the present invention.

Adjustment of the tension of the several springs $g$—$g^3$ is desirable and important. To this end, the lower spring seat is formed as a flange $l$ on a plunger $l'$, the lower end of which is pivotally connected to the arm $e'$ as by means of a pintle bolt $l^2$. The upper spring seat is formed as a nut $l^3$ through which is threaded a revoluble hollow screw $l^4$ which may be turned to move the nut $l^3$ to regulate the tension of the spring. A suitable bracket $a'$ on the vehicle frame $a$ holds the screw $l^4$ against axial movement while permitting rotation thereof. A flat side of the nut $l^3$ may bear against a flat member carried with vehicle body $a$ so that the nut cannot turn. By applying a wrench to a specially formed head $l^5$ on the screw $l^4$, the latter may be conveniently turned for spring adjustment.

Where the improved suspension is incorporated in a convertible track layer vehicle in which it has a special utility, drive sprockets $m$ and idler wheels $n$ for the track will be provided. The drive wheels $m$ may carry rollers $m'$ to engage and drive the lugs on the track and these rollers may be removed with the outer portion of the wheel $m$ to permit the substitution therefor of a conventional chain sprocket, when the vehicle is to be propelled as a road vehicle. The idler wheels $n$ are mounted on stub axles $n'$, having formed therewith sleeves $n^2$ slidable on arms $n^3$ which are supported on and keyed to the cross tube $e^{6'}$. The arms $n^3$ have lugs $n^4$ to receive adjusting screws $n^5$ which also engage the stub axles $n'$, whereby the wheels may be adjusted in relation to the track.

The cross tube $e^{6'}$ is journaled for rocking and may have keyed at its centre an arm $e^7$ with which cooperates a spring $o$, the action of this spring being transmitted to the idler wheels $n$ to hold the track against the yielding resistance of the spring. One end of the spring seats on the upper end of the arm $e^7$ and the other end on a nut $o'$ adjustable to the tension of the spring. This nut $o'$ is threaded on a rod $p$ which extends forwardly through the upper end of the arm $e^7$ and is threaded into a bracket $p'$ carried with the frame of the vehicle.

The improvements herein are applicable, as will be evident, to vehicles of other types than that conventionally illustrated herein and no limitation is to be imposed on the invention by reason of the disclosure other than as may appear in the claims.

What I claim is:

1. In combination with a vehicle frame and supporting wheels at opposite sides adapted to receive tracks thereover, suspension means for each wheel, including a rigid arm pivoted at one end to the frame and carrying a stub axle for the wheel at the other end and a spring receiving bracket carried by the frame, a substantially vertical spring seated in the bracket and pivotally secured to the arm intermediate its ends to resist movements thereof yieldingly, idler rolls for the track at its forward end and driving sprockets therefor at the rear end, and means for effecting longitudinal adjustment of the idler rolls with respect to said sprockets.

2. In combination with a vehicle frame, a pair of supporting wheels therefor disposed at opposite sides of the vehicle, a suspension for each of said wheels, including a hollow rock shaft, an arm carried by each rock shaft and a stub axle on said arm to support the wheels, respectively, and a hollow tube extending transversely of the vehicle frame and rigidly supported therein and receiving the rock shafts in alignment to support them for oscillation, and a tie rod extending through said hollow rock shafts to secure them against axial displacement.

WALTER CHRISTIE.